US006979089B2

(12) United States Patent  (10) Patent No.: US 6,979,089 B2
Martinson  (45) Date of Patent: Dec. 27, 2005

(54) MULTI-VIEW MIRROR ASSEMBLY FOR A VEHICLE

(76) Inventor: Lowell Martinson, 16455 S. 15th St., Phoenix, AZ (US) 85048

( * ) Notice: Subject to any disclaimer, the term of this patent is extended or adjusted under 35 U.S.C. 154(b) by 0 days.

(21) Appl. No.: 10/928,378

(22) Filed: Aug. 27, 2004

(65) Prior Publication Data
US 2005/0185309 A1 Aug. 25, 2005

Related U.S. Application Data

(60) Provisional application No. 60/546,921, filed on Feb. 23, 2004.

(51) Int. Cl.⁷ ............................. B60R 1/08; G02B 7/182
(52) U.S. Cl. ...................... 359/863; 359/857; 359/862; 359/872; 359/900
(58) Field of Search ................................ 359/844, 857, 359/862, 863, 864, 865, 872, 900

(56) References Cited

U.S. PATENT DOCUMENTS

| 1,870,468 | A | * | 8/1932 | Ross | 359/863 |
| 1,877,997 | A | * | 9/1932 | Shapiro et al. | 359/862 |
| 1,986,033 | A | * | 1/1935 | Trufant | 359/846 |
| 3,485,555 | A | * | 12/1969 | Morris | 359/862 |
| 2004/0057133 | A1 | * | 3/2004 | Chen | 359/844 |

FOREIGN PATENT DOCUMENTS

| DE | 3122948 A1 | * | 12/1982 | ................ 280/761 |
| EP | 0 235 993 A1 | * | 2/1987 | ................ 359/875 |
| GB | 2 206 089 A | * | 12/1988 | |
| JP | 56-060742 A | * | 5/1981 | ................ 359/877 |
| JP | 01-127430 A | * | 5/1989 | |
| JP | 05-238321 A | * | 9/1993 | |
| JP | 05-330384 A | * | 12/1993 | ................ 359/871 |
| JP | 10-194044 A | * | 7/1998 | |
| JP | 10-230789 A | * | 9/1998 | |
| JP | 11-099881 A | * | 4/1999 | |
| JP | 11-348660 A | * | 12/1999 | |
| JP | 2003-081017 A | * | 3/2003 | |
| WO | WO 90/12705 A1 | * | 11/1990 | |

OTHER PUBLICATIONS

PTO 98-4425: "Automobile Rear Under View Mirror", Translation of Japanese Kokai Patent Application Hei 1[1989]-127430 (KOITO MFG Co. Ltd), The Ralph Mcelroy Translation Co., U.S. Patent & Trademark Office, Sep. 1998.*

PTO-05-2857 "Vehicle Spoiler", English language translation of DE 31 22 948 A1 (Szperkowski), The Ralph McElroy Translation Company, U.S. Patent & Trademark Office, Apr. 2005.*

* cited by examiner

Primary Examiner—John Juba, Jr.
(74) Attorney, Agent, or Firm—Veronica-Adele R. Cao; Craig Weiss; Weiss, Moy & Harris, P.C.

(57) ABSTRACT

A multi-view mirror assembly for a vehicle dimensioned to allow a driver to view people, vehicles and other objects positioned lateral and downwardly vertical to a rear end of the vehicle is disclosed. The multi-view mirror assembly is mountable on either an exterior or an interior surface of the vehicle. Furthermore, the multi-view mirror is maneuverable so as to compensate for varying vehicle sizes and dimensions.

30 Claims, 7 Drawing Sheets

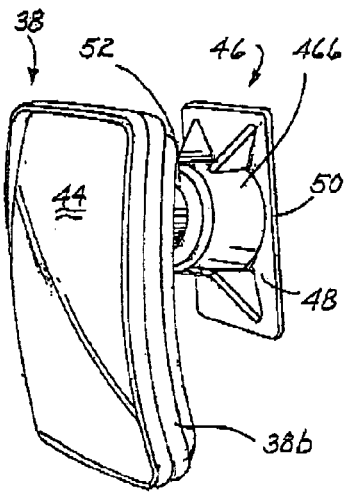
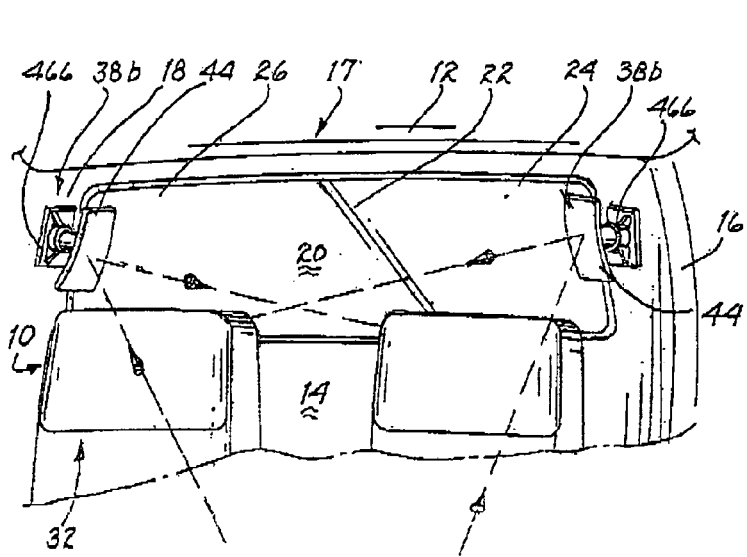
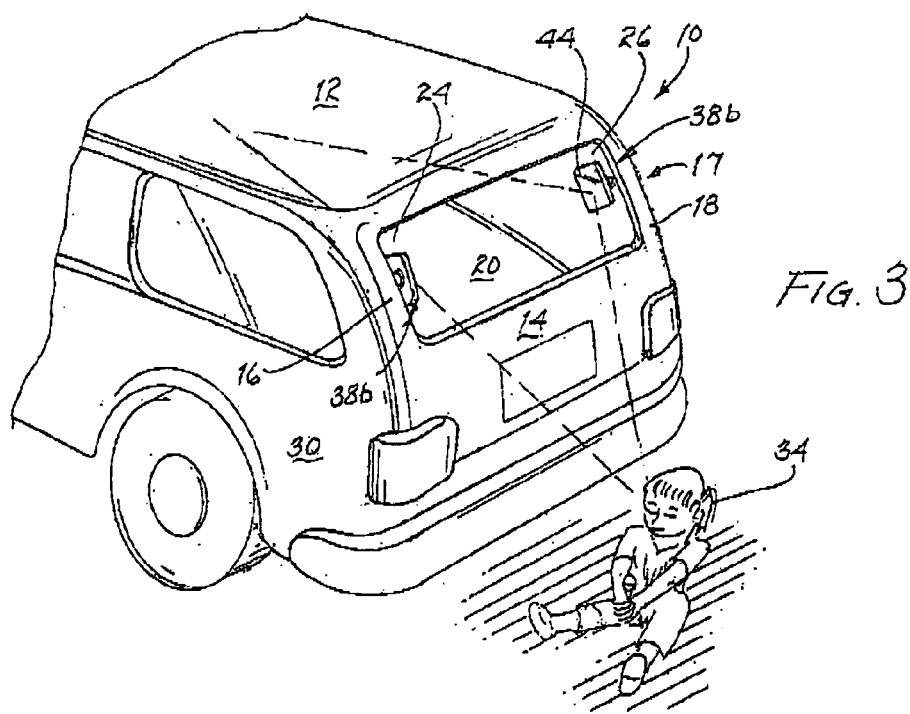

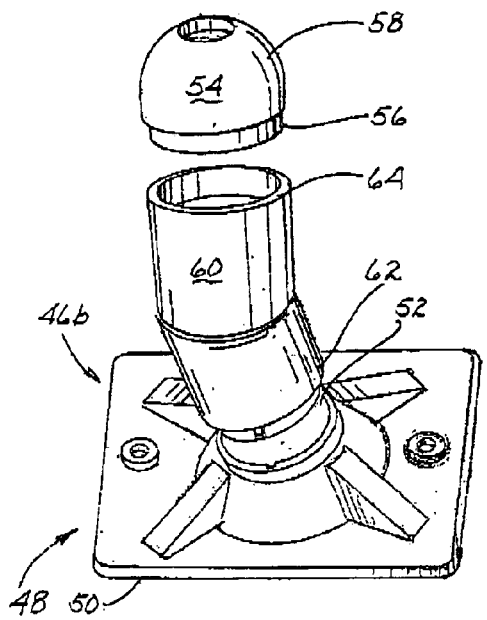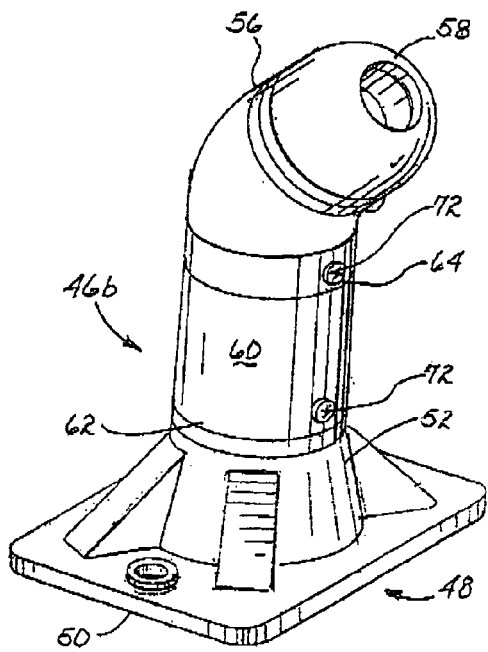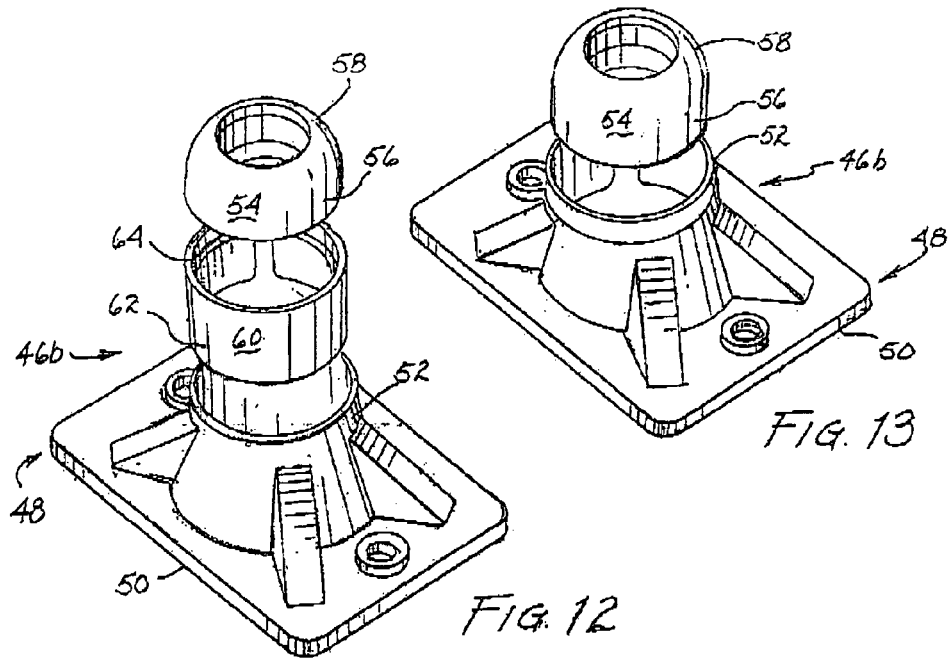

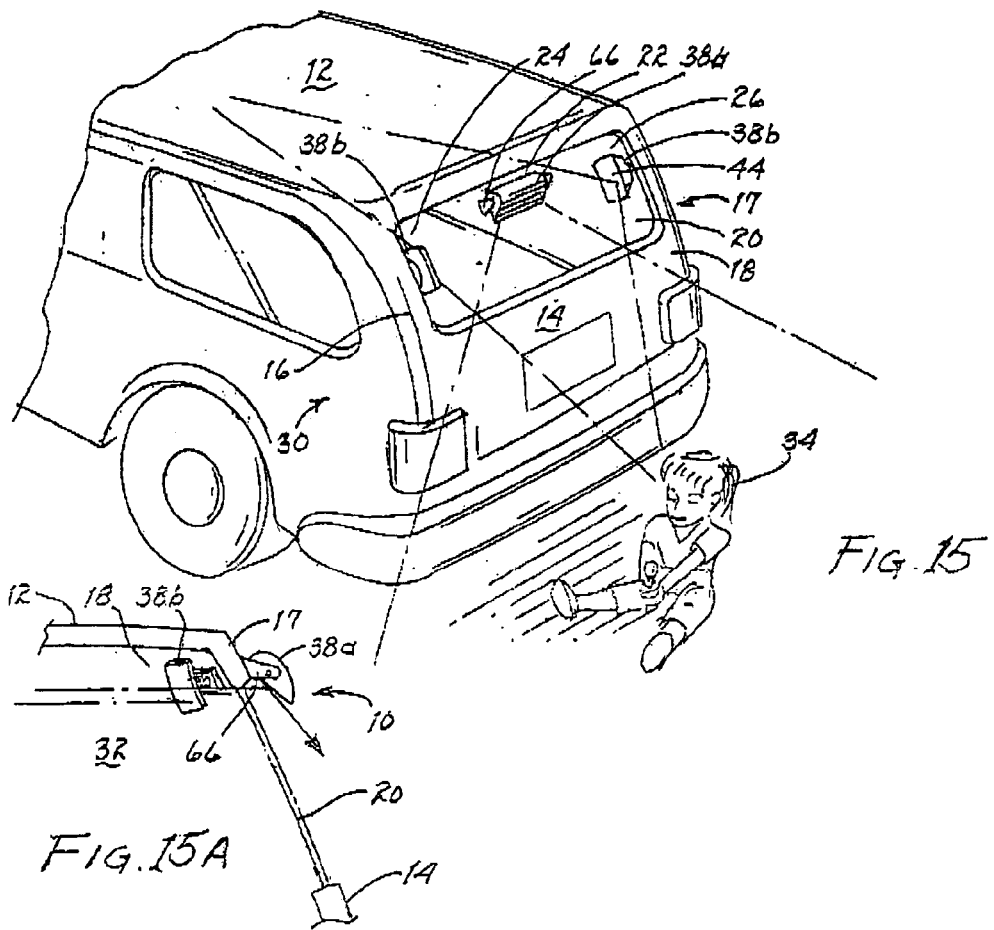
FIG. 15
FIG. 15A
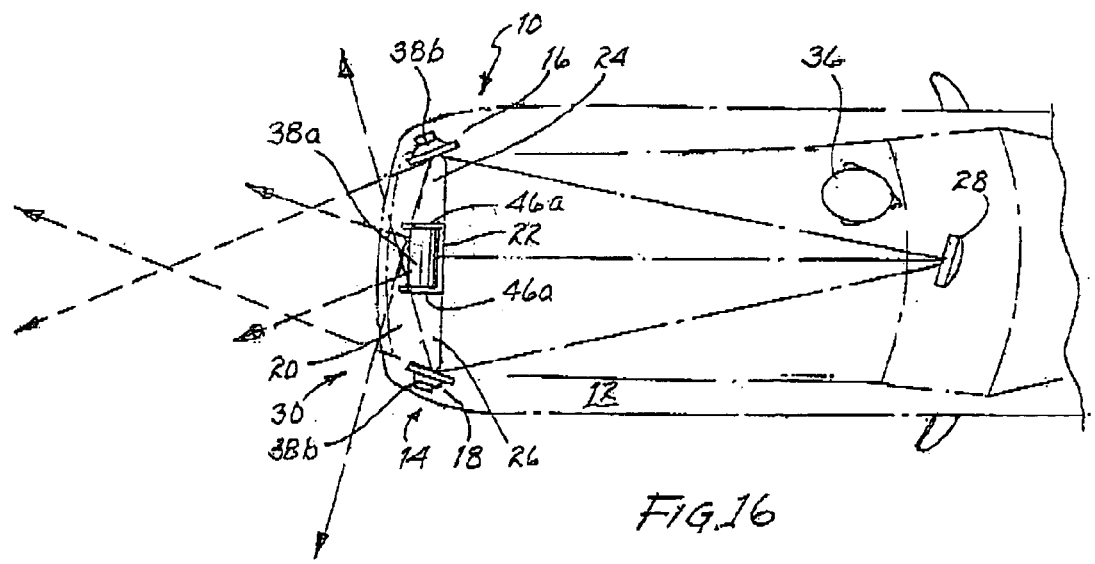
FIG. 16

MULTI-VIEW MIRROR ASSEMBLY FOR A VEHICLE

CROSS-REFERENCE TO RELATED APPLICATION

This application claims priority to a corresponding provisional application U.S. Ser. No. 60/546,921, filed Feb. 23, 2004 in the name of the applicant of this application.

FIELD OF THE INVENTION

This invention relates generally to mirrors for vehicles designed to aid a driver in identifying objects and, more specifically, to a multi-view mirror assembly dimensioned to allow a driver to view people, vehicles, and other objects positioned lateral and downwardly vertical to a rear end of the vehicle.

BACKGROUND OF THE INVENTION

Driving a car or other vehicle safely requires the driver to constantly be able to see other vehicles, objects and pedestrians. This is often difficult since a car has many blind-spots, and the driver generally is facing forward with limited ability to turn around and view surrounding areas. One situation where a driver's limited field of vision presents an especially acute problem is when pulling out of a parking spot. When a driver needs to back out of a parking space in which he or she is parked face-forward between two other vehicles, especially when those vehicles are large in size, the driver has no ability to see laterally to either side of the rear end of his or her vehicle to determine if there are pedestrians or other vehicles about to cross into his or her path. Often, most drivers in this situation simply back out slowly in an attempt to alert pedestrians and other cars of the vehicle's presence. This method is fraught with danger. It is often the case that pedestrians walking through a parking lot simply do not see a car as it backs out. The same is the case for another vehicle or a bike which might be passing quickly behind the driver's vehicle as he or she backs out. In all of these cases, it is the parked vehicle's driver who is responsible for insuring that his or her car does not strike a pedestrian or vehicle. In order to be sure that a pedestrian or vehicle is not approaching, the driver must be able to see laterally from the rear end of the driver's vehicle.

In addition to the pedestrians or other vehicles that may cross into a driver's path while the driver is backing out, another dangerous situation exists when a small child, animal, or object is present directly behind the vehicle. Studies show that in the United States, at least 58 children (more than one child per week) were backed over and killed in the year 2002. Often, these children are backed over by a relative in their own driveway, and often by a larger vehicle such as a van, minivan, or sport utility vehicle. Because of the smallness of the child, animal, or object, the driver will not be able to detect it by looking in the rear-view mirror nor by turning around and looking through the window of the vehicle. In order to be certain that a small child, animal, or object is not directly behind the vehicle, the driver must be able to see downwardly vertical from the rear end of the driver's vehicle.

There are some devices available today which aid in warning others when a vehicle is backing up. Some cars use audible backing signals, rear-facing video cameras, and electronic collision warning systems. Few cars are equipped with the video cameras or the electronic collision warning systems because they are fairly expensive. And the audible backing signals would prove to be ineffective over other loud competing noises and to a pedestrian that is deaf or hard-of-hearing.

Thus, a need has existed for a multi-view mirror assembly for a vehicle, especially a sport utility vehicle, van or minivan, dimensioned to allow a driver to view people, vehicles and other objects positioned lateral and downwardly vertical to a rear end of the vehicle. Preferably, the multi-view mirror assembly should be mountable on either an exterior or an interior surface of the vehicle. Still further, preferably, the multi-view mirror should be maneuverable so as to compensate for varying vehicle sizes and dimensions.

SUMMARY OF THE INVENTION

An object of the present invention is to provide a multi-view mirror assembly for a vehicle dimensioned to allow a driver to view people, vehicles and other objects positioned lateral and downwardly vertical to a rear end of the vehicle.

It is a further object of the present invention to provide a multi-view mirror assembly that is mountable on either an exterior or an interior surface of the vehicle.

It is a still further object of the present invention to provide multi-view mirror assembly that is adjustable so as to compensate for varying vehicle sizes and dimensions.

BRIEF DESCRIPTION OF THE PREFERRED EMBODIMENTS

In accordance with one embodiment of the present invention, a multi-view mirror assembly for a vehicle is disclosed. The multi-view mirror assembly comprises, in combination, a vehicle having a rear end, the rear end having a rear windshield coupled proximate a top edge of the rear end in a line of sight with a rear-view mirror of the vehicle, and at least one mirror unit coupled to at least one of the rear end and the rear windshield of the vehicle in line of sight with the rear-view mirror of the vehicle and dimensioned to allow a driver to view objects positioned substantially lateral and substantially downwardly vertical to the rear end of the vehicle by looking at the rear-view mirror and seeing a reflection of the objects through the at least one mirror unit.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 is a perspective view of one embodiment of a mirror unit of the present invention. A mounting assembly is also shown coupled to the mirror unit.

FIG. 2 is a perspective cross-sectional view of an interior portion of a vehicle showing one embodiment of a multi-view mirror assembly of the present invention coupled to a rear end of an interior surface of the vehicle.

FIG. 3 is an elevated perspective view of the multi-view mirror assembly of FIG. 2. As shown, the multi-view mirror assembly is able to reflect objects, such as a small child, seated substantially downwardly vertical from the rear end of the vehicle.

FIG. 10 is an exploded view of a mounting assembly having a bracket, an angled extension, and a dome. The mounting assembly is shown as being press-fit.

FIG. 11 is a perspective view of a mounting assembly having a bracket, a straight extension, an angled extension, and a dome. The mounting assembly is shown as being coupled with screws.

FIG. 12 is an exploded view of a mounting assembly having a bracket, a straight extension, and a dome. The mounting assembly is shown as being press-fit.

FIG. 13 is an exploded view of a mounting assembly having a bracket and a dome. The mounting assembly is shown as being press-fit.

FIG. 15 is a perspective view of yet another embodiment of the multi-view mirror assembly of the present invention shown coupled to both an interior surface of the rear end of the vehicle and an exterior surface of the rear windshield of the vehicle. As shown, the multi-view mirror assembly is able to reflect objects, such as a small child, located substantially downwardly vertical from the rear end of the vehicle.

FIG. 15A is a cross-sectional view of a rear end of a vehicle showing the multi-view mirror assembly of FIG. 15 coupled to both an interior surface of the rear end of the vehicle and an exterior surface of the rear windshield of the vehicle.

FIG. 16 is a top view of the multi-view mirror assembly of FIG. 15.

DETAILED DESCRIPTION OF THE PREFERRED EMBODIMENTS

Figure 4:
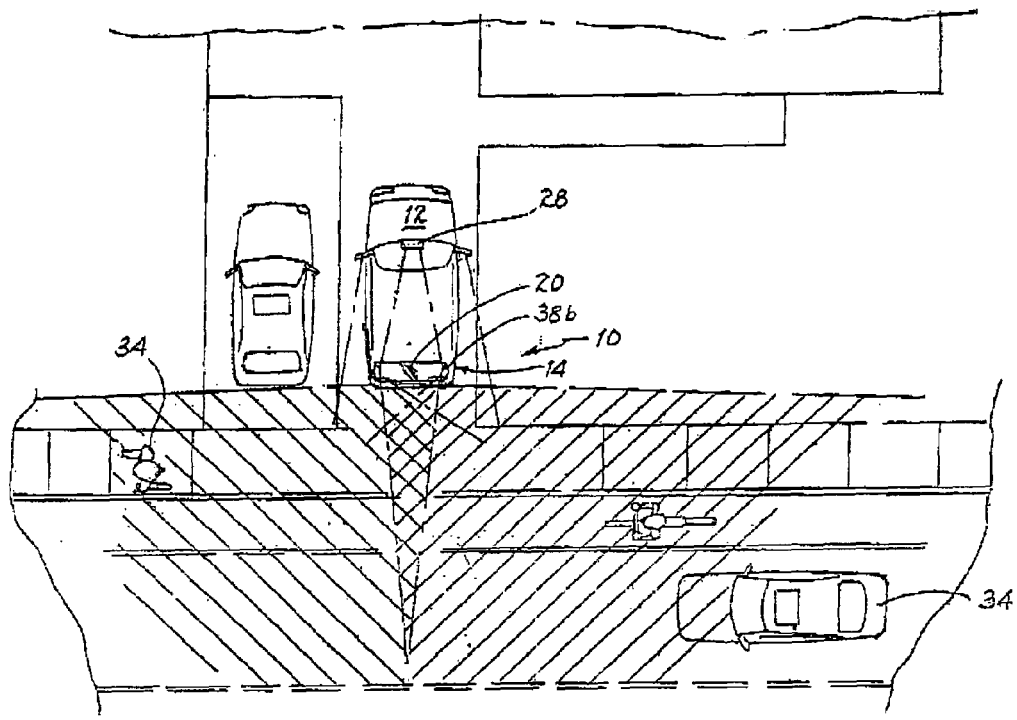
FIG. 4 is a top view of the area capable of being reflected by the multi-view mirror assembly. As shown, the multi-view mirror assembly is able to reflect areas substantially lateral to the rear end of the vehicle.
Figures 5A, 5B, 5C:
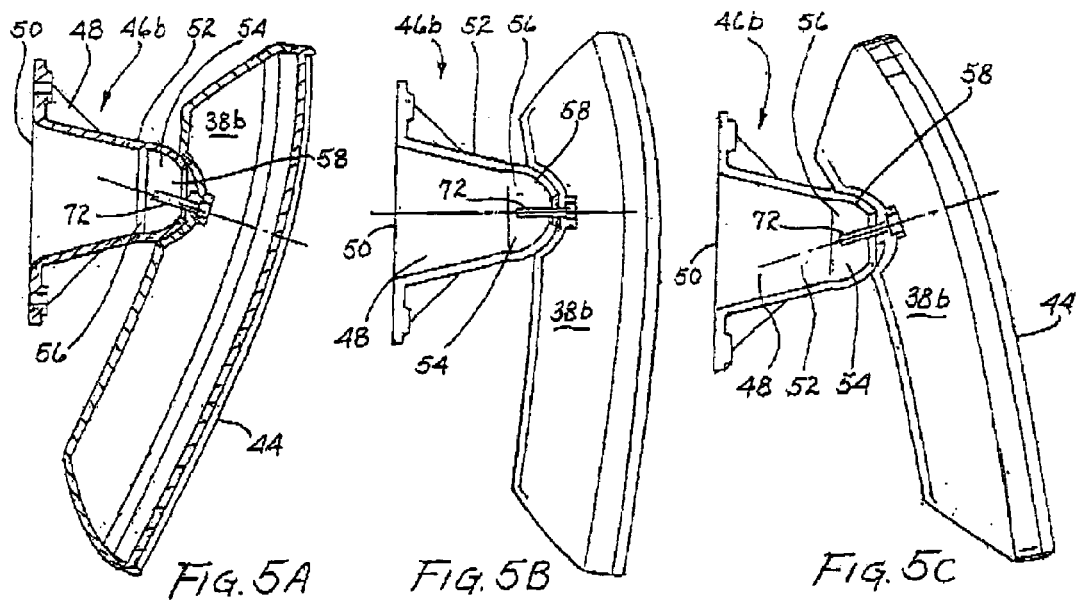
FIG. 5A is a side, cross-sectional view of the mirror unit of FIG. 1 shown adjusted downwardly.
FIG. 5B is a side view of the mirror unit of FIG. 1 shown unadjusted.
FIG. 5C is a side view of the mirror unit of FIG. 1, shown adjusted upwardly.
Figures 6, 7:
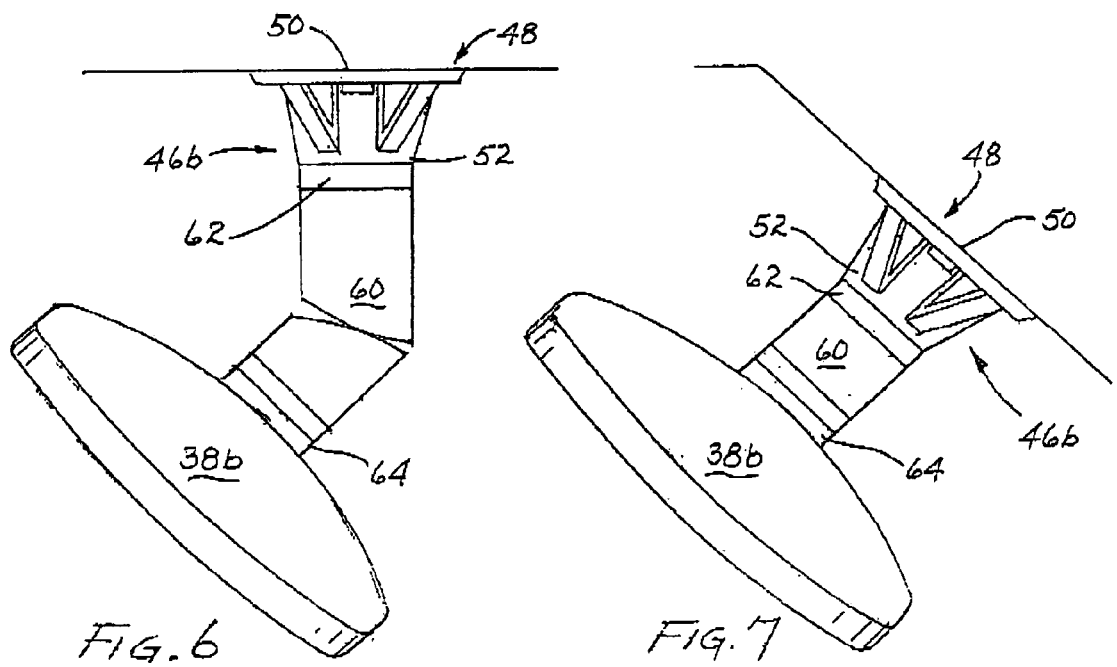
FIG. 6 is a side view of the mirror unit of FIG. 1 having an angled extension.
FIG. 7 is a side view of the mirror unit of FIG. 1 having a straight extension.

The novel features believed characteristic of the invention are set forth in the appended claims. The invention will best be understood by reference to the following detailed description of illustrated embodiments when read in conjunction with the accompanying drawings, wherein like reference numerals and symbols represent like elements.

Referring to FIGS. 1–16, a multi-view mirror assembly for a vehicle, hereinafter multi-view mirror assembly 10 (see FIGS. 2–4, 14A, 14B, 15, 15A and 16), is disclosed. The multi-view mirror assembly 10 comprises, in combination, a vehicle 12 (see FIGS. 2–4, 14A, 14B, 15, 15A and 16) and at least one mirror unit 38 coupled to the vehicle 12 by a mounting assembly 46. Preferably the mirror unit 38 comprises an aspheric glass mirror 44, although it should be clearly understood that substantial benefit may be derived from other reflective surfaces.

Figure 14A:
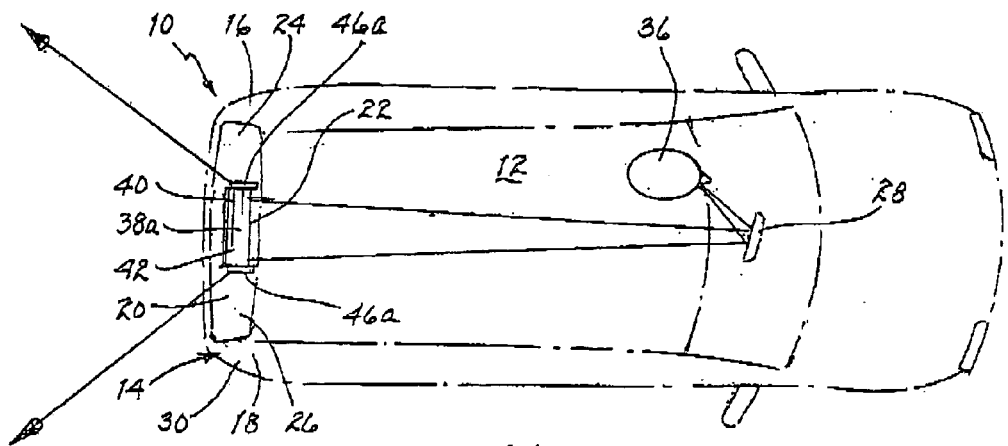
FIG. 14A is a top view of another embodiment of the multi-view mirror assembly of the present invention shown coupled to an exterior surface of a rear windshield of a vehicle.
Figure 14B:
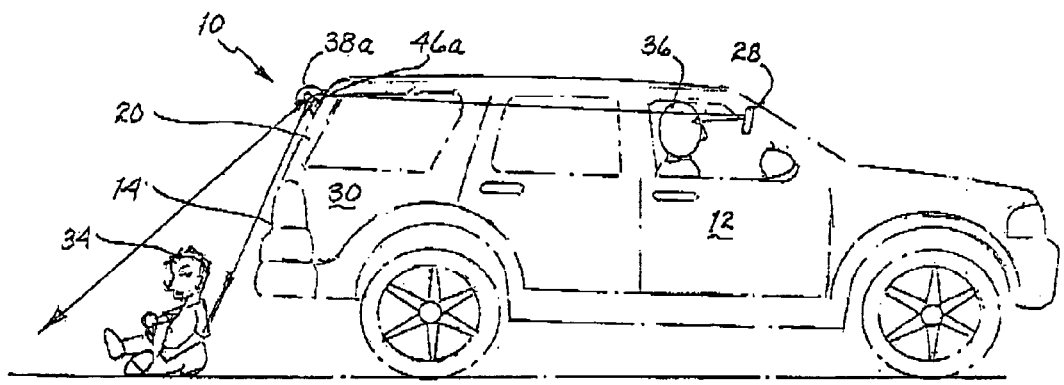
FIG. 14B is a side view of the multi-view mirror assembly of FIG. 14A. As shown, the multi-view mirror assembly is able to reflect objects, such as a small child, located substantially downwardly vertical from the rear end of the vehicle.

In one embodiment of the present invention, only one mirror unit 38 is used (see FIGS. 14A and 14B). In another embodiment, two mirror units 38 are used (see FIGS. 2, 3, and 4). And in yet another embodiment, three mirror units 38 are used (see FIGS. 15, 15A, and 16). Although these three combinations of the mirror units 38 are shown in the drawings, it should be clearly understood that alternative combinations of the mirror units 38 may be used so long as they allow a driver 36 (see FIGS. 14A, 14B and 16) to see objects substantially lateral and substantially downwardly vertical from a rear end 14 of the vehicle 12.

As shown in FIGS. 2, 3, 4, 14A, 14B, 15 15A, and 16, the rear end 14 of vehicle 12 has a rear windshield 20 coupled proximate a top edge of the rear end 14 in a line of sight with a rear-view mirror 28 (see FIGS. 14A, 14B, and 16) of the vehicle 12. The mirror unit 38 is capable of being coupled to either the rear end 14 of the vehicle 12 or to the rear windshield 20 of the vehicle 12, so long as the mirror unit 38 is coupled in line of sight with the rear-view mirror 28 of the vehicle 12. Furthermore, the mirror unit 38 is dimensioned to allow the driver 36 to view objects, such as people 34 (see FIGS. 3, 4, 14B, and 15) or objects positioned substantially lateral (see FIG. 4) and substantially downwardly vertical (see FIGS. 3, 14B, and 15) to the rear end 14 of the vehicle 12 by looking at the rear-view mirror 28 and seeing a reflection of the object or person 34 through the mirror unit 38.

Referring to FIGS. 14A, 14B, 14C, 15, 15A, and 16, one embodiment of the mirror unit 38a (referred to generically as mirror unit 38) is shown. The mirror unit 38a may be coupled to the rear windshield 20 (see FIGS. 14A, 14B, and 15) or to the rear end 14 of the vehicle 12 (see FIGS. 15A and 16). Preferably, the mirror unit 38a is coupled to an exterior top center portion 17 of the rear end 14 of the vehicle 12 or to an exterior top center portion 22 of the rear windshield 20 of the vehicle 12. In this embodiment, the mirror unit 38a is preferably coupled to an exterior portion 30 (see FIGS. 3, 14A, 14B, 15, and 16) of the vehicle 12.

Figure 14C:
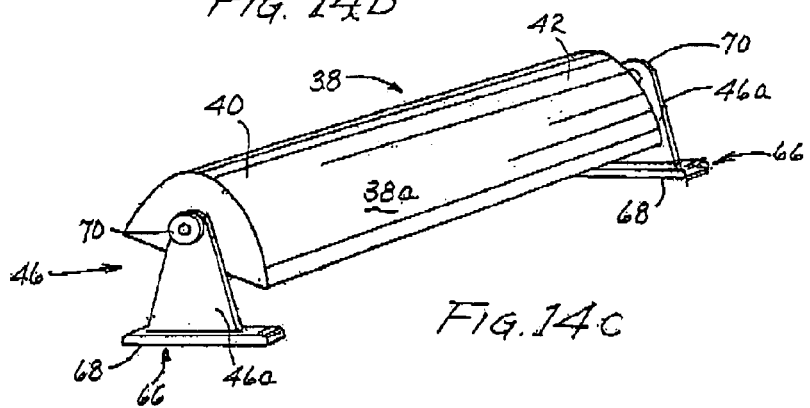
FIG. 14C is a perspective view of another embodiment of the mirror unit of the present invention.

Referring now to FIGS. 14A, 14B, 14C, and 16, one embodiment of the mounting assembly 46a (referred to generically as mounting assembly 46) is shown. As shown in FIG. 14c, the mounting assembly 46a comprises two bases 66, one base 66 being attached to a first end 40 of the mirror unit 38a and another base 66 being attached to a second end 42 of the mirror unit 38a. Each base 66 has a first end 68 dimensioned to be coupled to either the rear end 14 of the vehicle 12 or the rear windshield 20 of the vehicle 12. In addition, each base 66 has a second end 70 dimensioned to be coupled to the mirror unit 38a. Together, the bases 66 preferably permit pivotal adjustment of the mirror unit 38a relative to the bases 66. Although it is preferred that two bases 66 be used to couple the mirror unit 38a to the vehicle 12, it should be clearly understood that substantial benefit may be derived from the use of only one base 66 or more than two bases 66, so long as the base(s) 66 couple the mirror unit 38a to the vehicle 12.

Referring now to FIGS. 1–9 and FIGS. 15–16, a second embodiment of the mirror unit 38b (referred to generically as mirror unit 38) is shown. The mirror unit 38b may be coupled to the rear windshield 20 or to the rear end 14 of the vehicle 12. Referring now to FIGS. 2, 3, 14A, 15 and 16, preferably one mirror unit 38b would be coupled to either a driver side portion 16 of the rear end 14 of the vehicle 12 or to a driver side portion 24 of the rear windshield 20 of the vehicle 12. And a second mirror unit 38b would be coupled to either a passenger side portion 18 of the rear end 14 of the vehicle 12 or to a passenger side portion 26 of the rear windshield 20 of the vehicle 12. In this embodiment, the mirror unit 38b is preferably coupled to an interior portion 32 (see FIGS. 2, 3, and 15A) of the vehicle 12 either to the rear windshield 20 or to the rear end 14 or both. Further preferably, the mirror unit 38b may be either substantially square-shaped (see FIGS. 1–3) or they may be substantially rectangular-shaped (see FIGS. 5A–9).

Referring now to FIGS. 1, 2, and FIGS. 5A–13, a second embodiment of the mounting assembly 46b (referred to generically as mounting assembly 46) is shown. The mounting assembly 46b comprises a bracket 48 (see FIGS. 1 and 5A–13) and a dome 54 (see FIGS. 5A–5C and 8–13). The bracket 48 has a first surface 50 (see FIGS. 1 and 5A–13) dimensioned to be coupled to either the rear end 14 of the vehicle 12 or to the windshield 20 of the vehicle 12. The dome 54 has a first end 56 (see FIGS. 5A–5C and 8–13) dimensioned to be coupled to a second surface 52 (see FIGS. 1 and 5A–13) of the bracket 48. The dome 54 also has a second end 58 (see FIGS. 5A–5C and 8–13) dimensioned to be coupled to the mirror unit 38b so as to permit multi-axial adjustment of the mirror unit 38b relative to the mounting assembly 46b. Preferably, the mirror unit 38b may be adjusted by up to approximately 17 degrees in any direction relative to the dome 54. Although the preferred embodiment allows for up to approximately 17 degrees of adjustability, it should be clearly understood that substantial benefit may be derived from a greater or lesser degree of adjustability, so long as the adjustment compensates for the size and dimensions of the vehicle 12.

Referring now to FIGS. 6–10, depending upon the dimensions of the vehicle 12, the mounting assembly 46b may further comprise at least one extension 60 dimensioned to be coupled between the bracket 48 and the dome 54. Preferably, the extension 60 has a first end 62 dimensioned to be coupled to the second surface 52 of the bracket 48 and the extension 60 has a second end 64 dimensioned to be coupled to the first end 56 of the dome 54. The extension 60 may be angled (see FIG. 10) or the extension 60 may be straight (see FIGS. 11 and 12). If necessary, more than one extension 60 may be coupled in series. Although it is preferable that the angled extension 60 have an angle of approximately 45 degrees, it should be clearly understood that substantial benefit may be derived from the angled extension having an alternate angle, so long as the angle allows the driver 36 to view objects positioned substantially lateral and substantially downwardly vertical from the rear end 14 of the vehicle 12.

Figure 8:
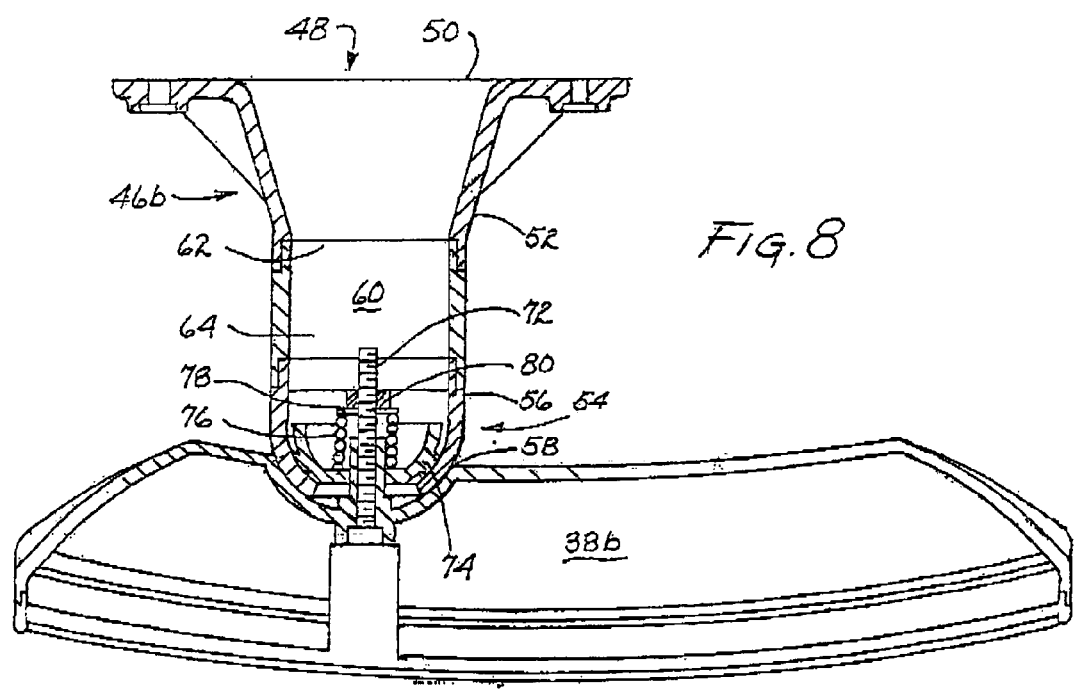
FIG. 8 is a side, cross-sectional view of the mirror unit and mounting assembly of FIG. 1.
Figure 9:
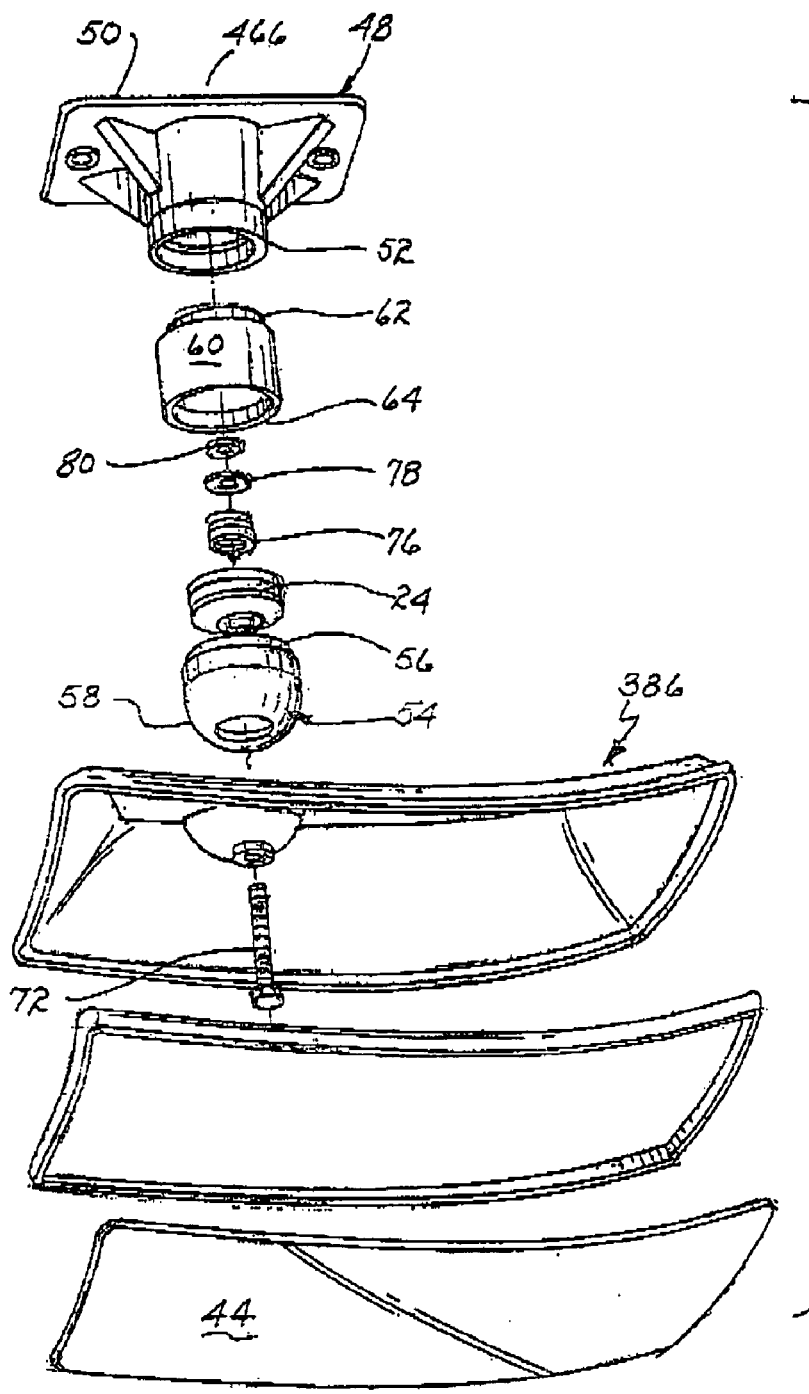
FIG. 9 is an exploded view of the mirror unit and mounting assembly of FIG. 1.

Referring now to FIGS. 8 and 9, the mounting assembly 46b is shown to further comprise a screw 72, a dome washer 74, a spring 76, a flat washer 78, and a nut 80 coupled together so as to facilitate the adjustment of the mirror unit 38b, although it should be clearly understood that substantial benefit may be derived from a mounting assembly 46b comprising alternative components, so long as the mounting assembly 46b allows for multi-axial adjustment of the mirror unit 38b.

Furthermore, the mounting assembly 46b may be either press-fit (see FIGS. 10, 12, and 13) or the mounting assembly 46b may be coupled with screws 72 (see FIG. 11). But it should also be clearly understood that substantial benefit may be derived from an alternative method of coupling, so long as the mounting assembly 46b provides the same amount of stability and adjustability for the mirror unit 38b.

STATEMENT OF OPERATION

In order to use the multi-view mirror assembly 10, a user preferably couples at least one mirror unit 38b, and preferably two mirror units 38b, to either an interior surface of the rear end 14 of the vehicle 12 or to an interior surface of the rear windshield 20 so that a driver 36 may view objects positioned substantially lateral and substantially downwardly vertical to the rear end 14 of the vehicle 12 by looking at the rear-view mirror 28 and seeing a reflection of the objects 34 through the at least one mirror unit 38. In a preferred embodiment, a third mirror unit 38a is coupled to an exterior surface of a center portion of either the rear end 14 of the vehicle 12 or to an exterior surface of a center portion of the rear windshield 20 so that a driver 36 may view objects 34 positioned substantially downwardly vertical from the rear end 14 of the vehicle 12. The mirror units 38 may be coupled by a user or installed at a manufacturing stage.

While the invention has been particularly shown and described with reference to preferred embodiments thereof, it will be understood by those skilled in the art that the foregoing and other changes in form and details may be made therein without departing from the spirit and scope of the invention. For example, although it is preferred that the mirror unit be adjustable by an actuator (not shown) disposed within either the mirror units 38 or their mounting assemblies 46, it should be clearly understood that substantial benefit may be derived from manual adjustment of the mirror units 38.

I claim:

1. A multi-view mirror assembly for a vehicle comprising, in combination:
   a vehicle having a rear end, said rear end having a rear windshield coupled proximate a top edge of said rear end in a line of sight with a rear-view mirror of said vehicle; and
   at least one mirror unit being coupled to at least one of said rear end and said rear windshield of said vehicle in line of sight with said rear-view mirror of said vehicle and dimensioned to allow a driver to view objects positioned substantially lateral and substantially downwardly vertical to said rear end of said vehicle by looking at said rear-view mirror and seeing a reflection of said objects through said at least one mirror unit, wherein said at least one mirror unit comprising an aspheric glass mirror and wherein said aspheric glass mirror having a radius of curvature of between approximately 15 inches and approximately 18 inches.

2. The assembly of claim 1 wherein said radius of curvature being approximately 17 inches.

3. The assembly of claim 1 further comprising a mounting assembly, said mounting assembly being dimensioned to couple said at least one mirror unit to one of said rear end and said rear windshield of said vehicle while at the same time said mounting assembly being dimensioned to permit adjustment of said at least one mirror unit relative to said mounting assembly.

4. The assembly of claim 3 further comprising an actuator disposed within one of said at least one mirror unit and said mounting assembly, said actuator configured to allow said driver to adjust said at least one mirror unit using a control proximate a driver seat.

5. The assembly of claim 3 wherein said at least one mounting assembly comprising at least one base, said at least one base comprising:
   a first end being coupled to one of said rear end and said rear windshield of said vehicle; and
   a second end being coupled to said at least one mirror unit and being dimensioned to permit pivotal adjustment of said at least one mirror unit relative to said at least one base.

6. The assembly of claim 5 wherein said at least one base being a first base and a second base, said second end of said first base being coupled to a first end of said at least one mirror unit and said second end of said second base being coupled to a second end of said at least one mirror unit.

7. The assembly of claim 3 wherein said at least one mounting assembly comprising:
   a bracket, said bracket having a first surface and a second surface, said first surface being coupled to one of said rear end and said rear windshield of said vehicle; and
   a dome, said dome having a first end and a second end, said first end of said dome dimensioned to be coupled to said second surface of said bracket, said second end of said dome dimensioned to be coupled to said at least one mirror unit so as to permit multi-axial adjustment of said at least one mirror unit relative to said mounting assembly.

8. The assembly of claim 7 wherein said dome permitting up to approximately 17 degrees of adjustment of said at least one mirror unit relative to said dome in any direction.

9. The assembly of claim 3 wherein said mounting assembly comprises:
   a bracket, said bracket having a first surface and a second surface, said first surface being coupled to one of said rear end and said rear windshield of said vehicle;
   at least one extension, said at least one extension having a first end and a second end, said first end being coupled to said second surface of said bracket; and
   a dome, said dome having a first end and a second end, said first end of said dome dimensioned to be coupled to said second end of said at least one extension, said second end of said dome dimensioned to be coupled to said at least one mirror unit so as to permit multi-axial adjustment of said at least one mirror unit relative to said dome.

10. The assembly of claim 9 wherein said at least one extension being substantially straight.

11. The assembly of claim 9 wherein said at least one extension being substantially angled.

12. The assembly of claim 11 wherein said at least one extension having an angle of approximately 45 degrees.

13. The assembly of claim 9 wherein said at least one extension having a length of between approximately 1 inch and approximately 3 inches.

14. The assembly of claim 9 wherein said at least one extension being at least two extensions coupled in series.

15. The assembly of claim 3 wherein said mounting assembly being a press-fit mounting assembly.

16. The assembly of claim 1 wherein said at least one mirror unit being coupled to one of a top center portion of said rear windshield of said vehicle and a top center portion of said rear end of said vehicle and dimensioned to allow a driver to view objects positioned substantially downwardly vertical to said rear end of said vehicle.

17. The assembly of claim 16 wherein said at least one mirror unit being coupled to an exterior portion of said vehicle.

18. The assembly of claim 1 wherein said at least one mirror unit being coupled to an interior portion of said vehicle.

19. A multi-view mirror assembly for a vehicle comprising, in combination:
   a vehicle having a rear end, said rear end having a rear windshield coupled proximate a top edge of said rear end in a line of sight with a rear-view mirror of said vehicle; and
   at least one mirror unit being coupled at least one of said rear end and said rear windshield of said vehicle in line of sight with said rear-view mirror of said vehicle and dimensioned to allow a driver to view objects positioned substantially lateral and substantially downwardly vertical to said rear end of said vehicle by looking at said rear-view mirror and seeing a reflection of said objects through said at least one mirror unit, wherein said at least one mirror unit being:
      a first mirror unit coupled to one of a driver side portion of said rear end of said vehicle and a driver side portion of said rear windshield of said vehicle, and said first mirror unit dimensioned to allow a driver to view objects positioned substantially downwardly vertical to said rear end of said vehicle while at the same time said first mirror unit being dimensioned to allow said driver to view objects positioned substantially lateral toward a passenger side of said vehicle; and
      a second mirror unit coupled to one of a passenger side portion of said rear end of said vehicle and a passenger side portion of said rear windshield of said vehicle, and said second mirror unit dimensioned to allow said driver to view objects positioned substantially downwardly vertical to said rear end of said vehicle while at the same time said second mirror unit being dimensioned to allow said driver to view objects positioned substantially lateral toward a driver side of said vehicle.

20. The assembly of claim 19 wherein said first mirror unit and said second mirror unit being coupled to an interior portion of said vehicle.

21. The assembly of claim 19 further comprising a third mirror unit coupled to one of a top center portion of said rear windshield of said vehicle and a top center portion of said rear end of said vehicle and dimensioned to allow a driver to view objects positioned substantially downwardly vertical to said rear end of said vehicle.

22. The assembly of claim 21 wherein said first mirror unit and said second mirror unit being coupled to an interior portion of said vehicle and wherein said third mirror unit being coupled to an exterior portion of said vehicle.

23. The assembly of claim 19 wherein at least one of said mirror units has a substantially rectangular configuration.

24. The assembly of claim 19 wherein at least one of said mirror units has a substantially square configuration.

25. A method for viewing objects lateral and downwardly vertical to a rear portion of a vehicle comprising, in combination, the steps of:
   providing a vehicle having a rear end, said rear end having a rear windshield coupled proximate a top edge of said rear end in a line of sight with a rear-view mirror of said vehicle;
   providing at least one mirror unit;
   coupling said at least one mirror unit to at least one of said rear end and said rear windshield of said vehicle in line of sight with said rear-view mirror of said vehicle so that a driver is able to view objects positioned substantially lateral and substantially downwardly vertical to said rear end of said vehicle by looking at said rear-view mirror and seeing a reflection of said objects through said at least one mirror unit, wherein said steps of providing at least one mirror unit and coupling said at least one mirror unit include:

providing a first mirror unit;

coupling said first mirror unit to an interior surface of one of a driver side portion of said rear end of said vehicle and a driver side portion of said rear windshield of said vehicle so that a driver is able to view objects positioned substantially downwardly vertical to said rear end of said vehicle while at the same time said first mirror unit is dimensioned to allow said driver to view objects positioned substantially lateral toward a passenger side of said vehicle;

providing a second mirror unit;

coupling said second mirror unit to an interior surface of one of a passenger side portion of said rear end of said vehicle and a passenger side portion of said rear windshield of said vehicle so that a driver is able to view objects positioned substantially downwardly vertical to said rear end of said vehicle while at the same time said second mirror unit is dimensioned to allow said driver to view objects positioned substantially lateral toward a driver side of said vehicle.

26. The method of claim 25 further comprising the steps of:

providing at least one mounting assembly coupled to at least one of said mirror units;

coupling at least one said mounting assembly to one of said rear end and said rear windshield of said vehicle; and adjusting at least one of said mirror units relative to said mounting assembly to allow a driver to view objects positioned substantially lateral and substantially downwardly vertical to said rear end of said vehicle by looking at said rear-view mirror and seeing a reflection of said objects through at least one of said mirror units.

27. The method of claim 25 further comprising the steps of:

providing at least one base having a first end and a second end;

coupling said first end of said base to one of said rear end and said rear windshield of said vehicle;

coupling said second end to said at least one mirror unit; and adjusting said at least one mirror unit relative to said at least one base.

28. The method of claim 27 further comprising the steps of:

providing a second base having a first end and a second end;

coupling said first end of said second base to one of said rear end and said rear windshield of said vehicle;

coupling said second end of said second base to said at least one mirror unit; and adjusting said at least one mirror unit relative to said first base and said second base.

29. The method of claim 25 further comprising the step of coupling at least one mirror unit to an exterior surface of one of a top center portion of said rear windshield and a top center portion of said rear end of said vehicle.

30. The method of claim 25 further comprising the steps of:

providing a third mirror unit; and coupling said third mirror unit to an exterior surface of one of a top center portion of said rear windshield and a top center portion of said rear end of said vehicle.

* * * * *